United States Patent [19]

Carvey et al.

[11] Patent Number: 5,671,620
[45] Date of Patent: Sep. 30, 1997

[54] AUTOMOTIVE ANTITHEFT DEVICE

[76] Inventors: Donald F. Carvey; Glen Carvey, both of 222 Colby Dr., East Hartford, Conn. 06108

[21] Appl. No.: 424,103

[22] Filed: Apr. 19, 1995

[51] Int. Cl.$^6$ ................................................ B60R 25/00
[52] U.S. Cl. ................................ 70/238; 70/209; 70/199
[58] Field of Search ................... 70/181–187, 198–203, 70/209, 211, 225, 226, 237, 238, 256, 257; 74/575; 188/265

[56] References Cited

U.S. PATENT DOCUMENTS

| | | | |
|---|---|---|---|
| 1,193,679 | 8/1916 | Fox | 70/199 |
| 1,347,252 | 7/1920 | Cunningham | 70/203 |
| 1,351,651 | 8/1920 | Hunter et al. | 70/211 |
| 1,437,717 | 12/1922 | Brindamour | 70/211 |
| 1,531,062 | 3/1925 | Barravecchia | 70/202 |
| 1,967,998 | 7/1934 | Franke et al. | 70/200 |
| 2,716,336 | 8/1955 | Ross | 70/238 |
| 3,190,090 | 6/1965 | Zaidener | 70/238 |
| 3,245,239 | 4/1966 | Zaidener | 70/202 |
| 3,435,646 | 4/1969 | Michnoff | 70/203 |
| 3,550,409 | 12/1970 | Pariser | 70/203 |
| 3,990,280 | 11/1976 | Jahn | 70/238 |
| 4,432,432 | 2/1984 | Martin | 70/238 X |
| 4,615,192 | 10/1986 | Brown | 70/202 X |
| 4,730,470 | 3/1988 | Zane et al. | 70/238 |
| 4,779,435 | 10/1988 | Farrow | 70/238 |
| 5,005,388 | 4/1991 | Lo | 70/209 |
| 5,107,692 | 4/1992 | Chen | 70/209 |
| 5,157,951 | 10/1992 | Chen et al. | 70/209 |
| 5,259,222 | 11/1993 | Jang | 70/209 |
| 5,267,458 | 12/1993 | Heh | 70/238 |
| 5,297,406 | 3/1994 | Lin | 70/209 |
| 5,329,793 | 7/1994 | Chen | 70/209 |

FOREIGN PATENT DOCUMENTS 929857 1/1948 France.

*Primary Examiner*—Suzanne Dino
*Attorney, Agent, or Firm*—Fishman, Dionne, Cantor & Colburn

[57] ABSTRACT

An automotive antitheft device comprises an elongated member having upper and lower ends. A first hook depends from the lower end of the elongated member. A member is connected at one end thereof to the elongated member by a lock. This member further has a second hook depending from the other end thereof. When installed in an automobile, the first hook at the lower end of the elongated member is positioned about a shaft of the automobile brake pedal (or accelerator pedal) and the upper end of the elongated member extends through the automobile steering wheel in between the steering wheel's spokes. Also, the second hook is positioned about the steering wheel column.

20 Claims, 2 Drawing Sheets

AUTOMOTIVE ANTITHEFT DEVICE

BACKGROUND OF THE INVENTION

The present invention relates to automotive antitheft devices. More specifically, the present invention is related to an improved automotive antitheft device which is not easily defeated.

Automotive antitheft devices are known in the prior art.

U.S. Pat. Nos. 1,193,679; 3,190,090; 3,245,239; 3,550,409 and 5,259,222 each disclose automotive antitheft devices that engage the brake or gas pedal shafts and the steering wheel and/or the steering wheel spokes as a means for preventing theft of the vehicle in which they are installed. However, as is well known, each of these devices can be easily removed by cutting the steering wheel and/or of the automobile, U.S. Pat. Nos. 1,351,651 and 1,437,717 each disclose automotive antitheft devices that are attached to the steering wheel column, and remain attached even when the antitheft device is not in use, and engage the steering wheel spokes. These devices are not particularly well suited for present day automobiles due to present designs of steering wheels and steering wheel columns. Also, the device being always attached to the steering wheel column is unsightly and highly undesirable.

U.S. Pat. No 3,435,646 discloses an automotive antitheft device that is attached to the steering wheel column, and remains attached even when the antitheft device is not in use, and engages the brake pedal shaft, in the depressed condition, as a means for preventing theft of the vehicle in which it is installed. The device is not particularly well suited for present day automobiles due to present designs of steering wheel columns and dash boards. Also, the device being always attached to the steering wheel column is unsightly and highly undesirable.

U.S. Pat. No. 1,531,062 and France Patent No. 929,857 each disclose automotive antitheft devices that are attached to the steering wheel column, and remain attached even when the antitheft device is not in use, and engage the brake or gas pedal shaft and the steering wheel. Further, the attachment to the column is for the sole purpose of supporting the engagement portions at the steering wheel column when not in use. This attachment does not otherwise aid in the securing of the vehicle. These relatively complex devices are not particularly well suited for present day automobiles due to present designs of steering wheels, steering wheel columns and dash boards. Also, the device being always attached to the steering wheel column is unsightly and highly undesirable. Further, these devices remain in contact with the pedal even when not in use, which could pose a safety problem.

SUMMARY OF THE INVENTION

The above-discussed and other drawbacks and deficiencies of the prior art are overcome or alleviated by the automotive antitheft device of the present invention. In accordance with the present invention, the automotive antitheft device comprises an elongated member having upper and lower ends. A first hook depends from the lower end of the elongated member. A member is connected at one end thereof to the elongated member by a lock. This member further has a second hook depending from the other end thereof. When installed in an automobile, the first hook at the lower end of the elongated member is positioned about a shaft of the automobile brake pedal (or accelerator pedal) and the upper end of the elongated member extends through the automobile steering wheel in between the steering wheel's spokes. Also, the second hook is positioned about the steering wheel column.

Unlike the prior art devices, the present invention is easily removed from the steering column, steering wheel and pedal when not in use. Further, the present invention is simple and compact providing for ease of stowing when not in use. When properly installed and locked, the device of the present invention cannot be easily removed from the automobile, e.g., by cutting the steering wheel. Also, the positioning of the second hook about the steering wheel column is integral to securing the first hook in position about the pedal and in maintaining the other end of the device within the steering wheel between the steering wheel spokes.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several figures.

DESCRIPTION OF THE PREFERRED EMBODIMENT

Figure 1:
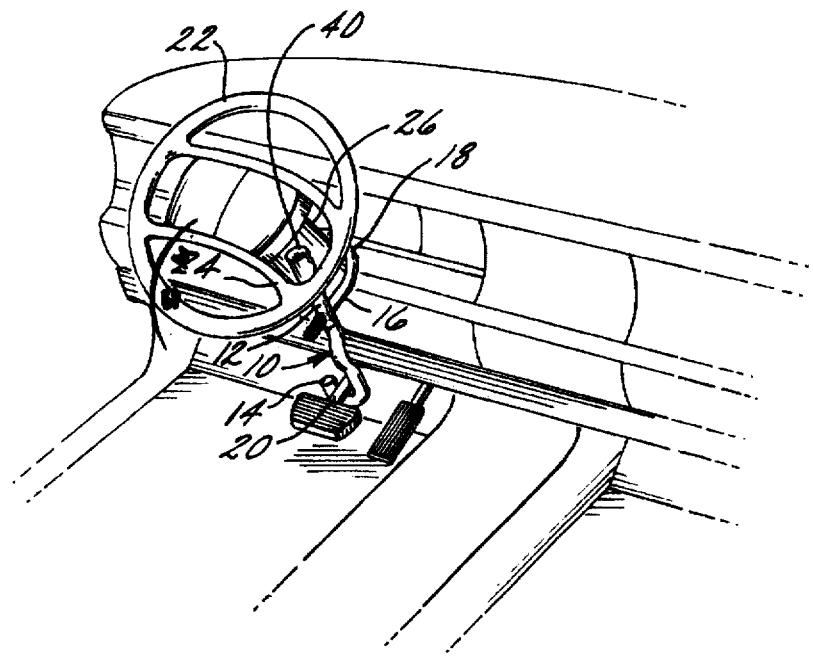
FIG. 1 is a perspective view of the automotive antitheft device installed in an automobile, with the interior of the automobile partially shown, in accordance with the present invention.

Referring to FIG. 1, an automotive antitheft device 10 is shown installed in an automobile in accordance with the present invention. Device 10 comprises an elongated member 12 having upper and lower ends. A hook 14 depends from the lower end of member 12. A member 16 is connected at one end thereof to member 12 and has a hook 18 depending from the other end thereof. When installed in an automobile, hook 14 at the lower end of member 12 is positioned about a shaft 20 of the automobile brake pedal (or accelerator pedal) and the upper end of member 12 extends through the automobile steering wheel 22 in between the steering wheel's spokes 24. Also, member 16 is secured to member 12 with hook 18 positioned about the steering wheel column 26.

Figure 2:
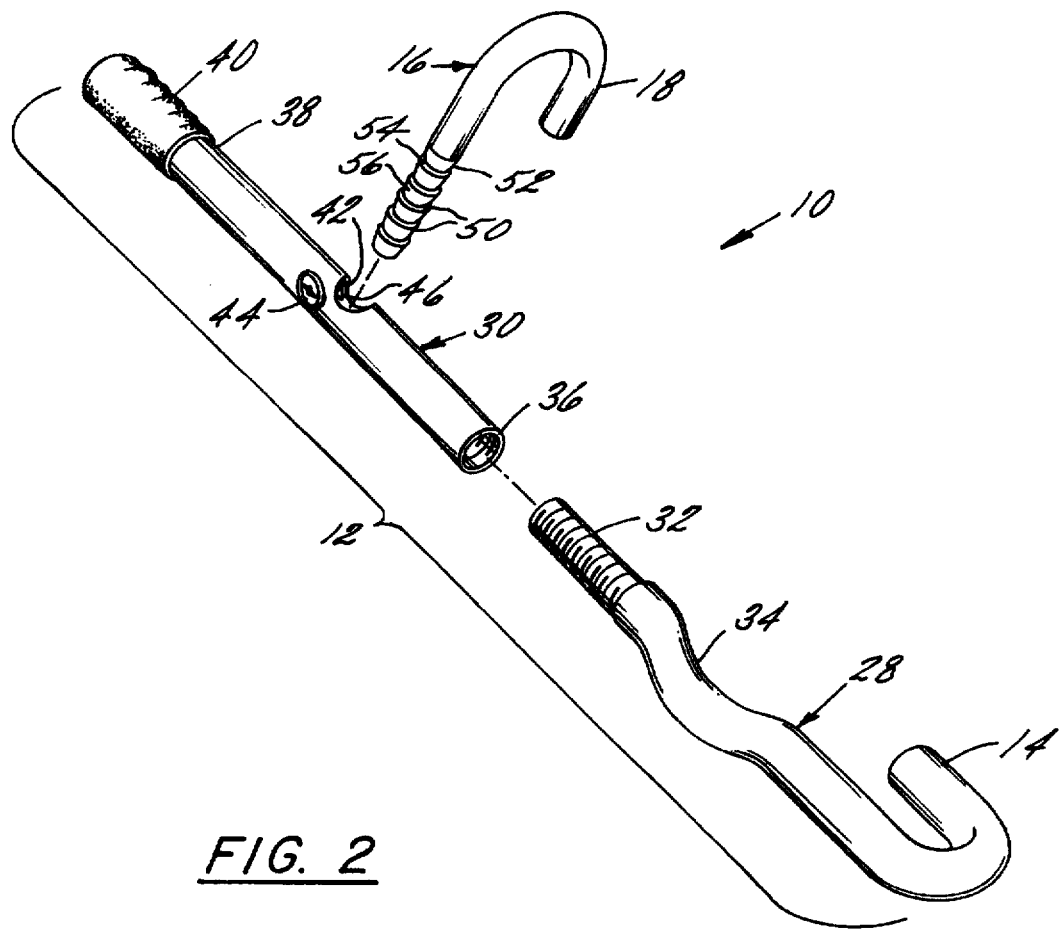
FIG. 2 is an exploded perspective view of the device shown in FIG. 1.

Referring to FIG. 2, an exploded perspective view of the automotive antitheft device 10 is generally shown. Member 12 preferably comprises a lower portion 28 which is rotary coupled to an upper portion 30, whereby device 10 can be adjusted for use in various makes of automobiles. However, it is within the scope of the present invention that portions 28 and 30 be a single continuous member, whereby a variety of lengths will be required to fit all the different automobiles.

Lower portion 28 is male threaded at end 32 thereof opposite hook 14. Further, lower portion 28 includes an arcuate region 34 between the male threads at end 32 and hook 14. Arcuate region 34 provides clearance around the automotive panel typically found under the dash board area for concealing wiring and other automotive components from view. Further, the direction of curvature of arcuate region 34 is generally perpendicular to the direction of curvature of hook 14.

Figure 3:
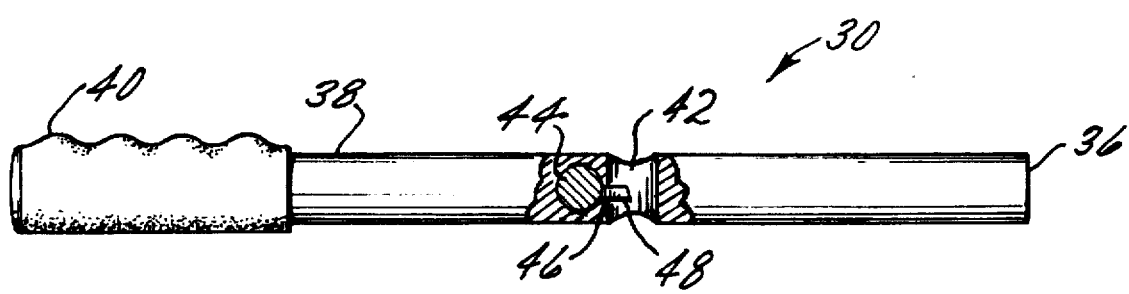
FIG. 3 is a side elevation view partly in cross section of the upper portion of the device shown in FIG. 1.

Upper portion 30 is female threaded at end 36 thereof and mates with male threads at end 32 of lower portion 28. Female threads at end 36 may be lined with, for example, nylon to avoid loosening of this rotary connection once it has been fixed for a particular automobile. The other end 38 of upper portion 30 is generally straight and may be covered with, for example, a rubber hand grip 40. Referring also to FIG. 3, upper portion 30 includes an opening 42 therethrough. A lock 44 is secured within portion 30 with a tab 46 (similar in function to a ratchet pawl) extending partially into opening 42 in the locked position and withdrawn from opening 42 in the unlocked position. Tab 46 includes an engagement surface 48. Lock 44 is preferably a lock that is not easily broken or forced to unlock, e.g., ABLOY CL-290 series.

Member 16 has a plurality of ratchet type engagements 50 at end 52 thereof opposite hook 18. Each ratchet type engagement 50 comprises an engagement surface 54 and a tapered surface 56 depending therefrom.

During use, lower portion 28 is attached to upper portion 30 such that with hook 14 around brake pedal shaft 20, end 38 extends sufficiently through and beyond automobile steering wheel 22 between steering wheel spokes 24. Further, opening 42 should be positioned such that when member 16 is inserted therein, hook 18 is positioned around steering wheel column 26 in close proximity to the intersection of the steering wheel column and the dash board area, which will assure that hook 14 cannot be released from the brake pedal shaft. This initial attachment of lower and upper portion 28 and 30 is preferably only required once for that particular automobile. Thereafter, hook 14 is positioned about brake pedal shaft 20 and end 38 is located beyond automobile steering wheel 22 with end 38 passing therethrough in between steering wheel strokes 24. Member 16 is then attached to upper portion 30, with lock 46 in the unlocked position. End 52 of member 16 is inserted into opening 42, while hook 18 is positioned about steering wheel column 26. Member 16 is inserted into opening 42 until it tightly fits about column 26, at which point lock 44 is locked causing tab 46 to enter opening 42, whereby surface 48 of tab 46 abuts a surface 54 on member 16 prohibiting removal of member 16 from opening 42.

Members 12 and 16 are preferably comprised of hardened steel or other suitable material that cannot be easily cut, bent, broken or otherwise deformed in such a manner to allow removal of device 10 from an automobile without unlocking the device. Further, members 12 (i.e., portions 28 and 30) and 16 are preferably coated to provide a more aesthetically pleasing appearance and to avoid scratching the interior of the automobile. This coating may be, for example, a vinyl coating which is commonly applied in a hot dip process, as is well known. The coating may also be color coated to make the device more visible, making the automobile having the device a less likely target for theft. Coloring can also be selected to match the automobile or otherwise.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A removable antitheft device for use with an automobile having a steering wheel, a steering wheel column, a dash board which intersects the steering wheel column and a shaft for a pedal, said antitheft device comprising:

a first member having upper and lower ends, said upper end of said first member extending through the inside of the steering wheel when said device is installed in the automobile, said lower end of said first member comprising a first hook, said first hook being disposed about the shaft of the pedal when said device is installed in the automobile, said first member having an opening therethrough;

a second member having opposing first and second ends, said first end of said second member comprising a second hook having a free end, said second hook being disposed about the steering wheel column near the intersection of the dash board and the steering wheel column when said device is installed in the automobile, said second end of said second member being disposed in said opening in said first member with said free end of said second hook extending away from said first member in a plane defined by first and second perpendicular axes, each of said first and second perpendicular axes being perpendicular to a third axis passing longitudinally through about a center of said first member when said device is installed in the automobile; and a lock for securing said second end of said second member in said opening in said first member.

2. The device of claim 1 wherein said first member comprises lower and upper interconnected portions.

3. The device of claim 2 wherein said upper and lower portions are connected by a rotary connection.

4. The device of claim 1 wherein said second member comprises an engagement near said second end thereof, said engagement cooperating with said lock to secure said second end of said second member in said opening in said first member.

5. The device of claim 4 wherein:

said engagement comprises a first surface;

said lock includes a tab having a second surface, said tab extending into said opening when said lock is in a locked position wherein said first surface engages said second surface to secure said second end of said second member in said opening in said first member.

6. The device of claim 1 wherein said lock is disposed within said first member near said opening therein.

7. The device of claim 1 wherein said first and second members are comprised of hardened steel.

8. The device of claim 1 further comprising:

a grip disposed at said upper end of said first member.

9. The device of claim 1 further comprising:

a coating on said first and second members.

10. The device of claim 1 wherein said first member further includes;

an arcuate region upward from said first hook, wherein the direction of curvature of said arcuate region is generally perpendicular to the direction of curvature of said first hook.

11. An antitheft device comprising:

a first member having upper and lower ends, said lower end of said first member comprising a first hook, said first member having an opening therein;

a second member having opposing first and second ends, said first end of said second member comprising a second hook having a free end, said second end of said second member being removably disposed in said opening in said first member with said free end of said second hook extending away from said first member in a plane defined by first and second perpendicular axes, each of said first and second perpendicular axes being perpendicular to a third axis passing longitudinally through about a center of said first member; and a lock for securing said second end of said second member in said opening in said first member when said lock is in a locked position.

12. The device of claim 11 wherein said first member comprises lower and upper interconnected portions.

13. The device of claim 12 wherein said upper and lower portions are connected by a rotary connection.

14. The device of claim 11 wherein said second member comprises an engagement near said second end thereof, said engagement cooperating with said lock to secure said second end of said second member in said opening in said first member.

15. The device of claim 14 wherein:

said engagement comprises a first surface;

said lock includes a tab having a second surface, said tab extending into said opening when said lock is in a locked position wherein said first surface engages said second surface to secure said second end of said second member in said opening in said first member.

16. The device of claim 11 wherein said lock is disposed within said first member near said opening therein.

17. The device of claim 11 wherein said first and second members are comprised of hardened steel.

18. The device of claim 11 further comprising:

a grip disposed at said upper end of said first member.

19. The device of claim 11 further comprising:

a coating on said first and second members.

20. The device of claim 11 wherein said first member further includes;

an arcuate region upward from said first hook, wherein the direction of curvature of said arcuate region is generally perpendicular to the direction of curvature of said first hook.

* * * * *